(12) United States Patent
Perini

(10) Patent No.: US 8,663,078 B2
(45) Date of Patent: Mar. 4, 2014

(54) ROLLER FOR THE TREATMENT OF PAPER WEB MATERIAL

(75) Inventor: Fabio Perini, Viareggio (IT)

(73) Assignee: Futura S.p.A., Capannori (LU) (IT)

( * ) Notice: Subject to any disclaimer, the term of this patent is extended or adjusted under 35 U.S.C. 154(b) by 344 days.

(21) Appl. No.: 13/056,999

(22) PCT Filed: Jul. 16, 2009

(86) PCT No.: PCT/IT2009/000313
§ 371 (c)(1),
(2), (4) Date: Feb. 1, 2011

(87) PCT Pub. No.: WO2010/016081
PCT Pub. Date: Feb. 11, 2010

(65) Prior Publication Data
US 2011/0136637 A1 Jun. 9, 2011

(30) Foreign Application Priority Data
Aug. 6, 2008 (IT) ................. F12008A0151

(51) Int. Cl.
*F16C 13/00* (2006.01)

(52) U.S. Cl.
USPC ............ 492/15; 492/20; 492/26; 492/6

(58) Field of Classification Search
USPC ............... 492/15, 6, 7, 16, 20, 26
See application file for complete search history.

(56) References Cited

U.S. PATENT DOCUMENTS

| | | | | |
|---|---|---|---|---|
| 3,512,475 A | * | 5/1970 | Dahl et al. | 100/170 |
| 5,146,664 A | * | 9/1992 | Biondetti | 492/7 |
| 5,419,242 A | * | 5/1995 | van Haag | 100/47 |
| 5,961,899 A | * | 10/1999 | Rossetti et al. | 264/40.1 |
| 6,361,483 B1 | * | 3/2002 | Kirchner | 492/16 |
| 6,773,383 B2 | * | 8/2004 | Bschorr et al. | 492/2 |
| 2008/0254960 A1 | * | 10/2008 | Thiemicke | 492/15 |

FOREIGN PATENT DOCUMENTS

| | | | |
|---|---|---|---|
| DE | 198 22 145 A1 | 12/1999 | |
| DE | 102005000025 A1 | 10/2006 | |
| EP | 0 447 651 A | 9/1991 | |
| WO | WO 2009074713 A2 * | 6/2009 | D21G 1/00 |

* cited by examiner

Primary Examiner — Essama Omgba
(74) Attorney, Agent, or Firm — McGlew and Tuttle, P.C.

(57) ABSTRACT

Roller for treating a paper web, particularly apt to be used within an embossing or a calendering unit, including a central fixed shaft (10) linked to a fixed frame (11) on both its ends, on the shaft (10) more low-friction elements (12) being mounted, on the low-friction elements a tubular skirt (2) being mounted coaxially with the shaft (10), the skirt (2) being free to rotate about the longitudinal axis (x-x) of the shaft (10) and being subject to vibrations during the rotation. The roller including structure for dampening vibrations, the dampening structure being provided and acting between the skirt (2) and the shaft (10).

10 Claims, 4 Drawing Sheets

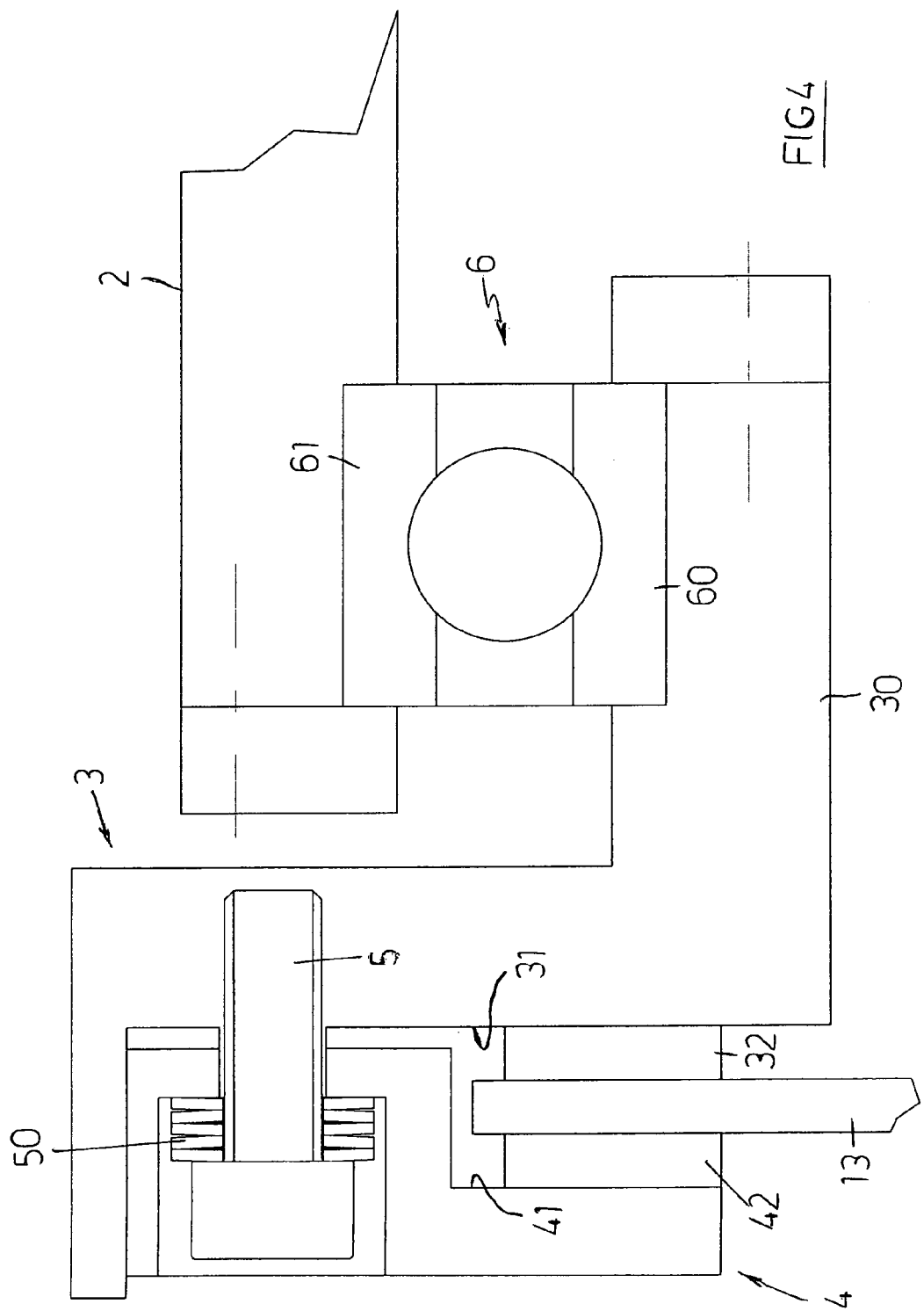

ROLLER FOR THE TREATMENT OF PAPER WEB MATERIAL

CROSS REFERENCE TO RELATED APPLICATIONS

This application is a United States National Phase Application of International Application PCT/IT2009/000313 and claims the benefit of priority under 35 U.S.C. §119 of Italian patent application FI2008A000151 filed Aug. 6, 2008, the entire contents of which are incorporated herein by reference.

FIELD OF THE INVENTION

The invention relates to a roller for the treatment of paper web material destined to be used, in particular, in embossing or calendering units. A roller according to the present invention is of the type comprising a fixed axis onto which there is mounted a jacket destined to rotate about the same axis.

BACKGROUND OF THE INVENTION

A roll of the type mentioned above, which can be used as part of operative units destined to the embossing or even to the calendering of a paper web, is generally subject to unwanted vibrations which are primarily due to surface or thickness disuniformity of the jacket, also caused by wear, as well as by the deformation of the jacket provoked by the loads acting during the paper web embossing or calendering.

SUMMARY OF THE INVENTION

The main purpose of this invention is to eliminate, or at least greatly reduce, the above-mentioned disadvantages.

This result has been achieved, in accordance with the present invention, by adopting the idea of making a device having a central fixed shaft linked to a fixed frame on both ends thereof. Low-friction elements are mounted on the shaft. A tubular skirt is mounted on the low-friction elements. The tubular skirt is coaxial with the shaft. The tubular skirt is free to rotate about a longitudinal axis of the shaft and is subject to vibrations during rotation. A means is provided for dampening the vibrations. The dampening means is provided and acts between the tubular skirt and the shaft. The dampening means comprises a pair of disks. Each of the disks is solid to a respective base of the shaft and coaxial with the shaft. Each of the disks has a portion in contact with two frictioning rings which are connected with the tubular skirt.

A contact pressure between the frictioning rings and the disks may be adjustable.

The frictioning rings may be respectively provided by a flange and a counter-flange connected with the tubular skirt by means of a bearing made by an external ring and an inner ring.

The tubular skirt may be mounted on the external ring of the bearing and the flange may be mounted on the inner ring of the same bearing.

Thanks to the present invention, the vibrations are damped, to the benefit of the quality and accuracy of the treatment executed on the web material. In addition, the damping of said vibrations allows to make lighter structures which are also subject to less stress. Additional benefits derive from the structural and constructive simplicity of the invention, that involves also advantages in terms of costs and reliability of the roller.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is an enlarged detail of FIG. 1.

DESCRIPTION OF THE PREFERRED EMBODIMENTS

Reduced to its essential structure and with reference to the figures of the attached drawings, a roller (1) in accordance with the present invention includes a central drive shaft (10), firmly bound to a fixed frame (11) at its ends.

Figure 1:
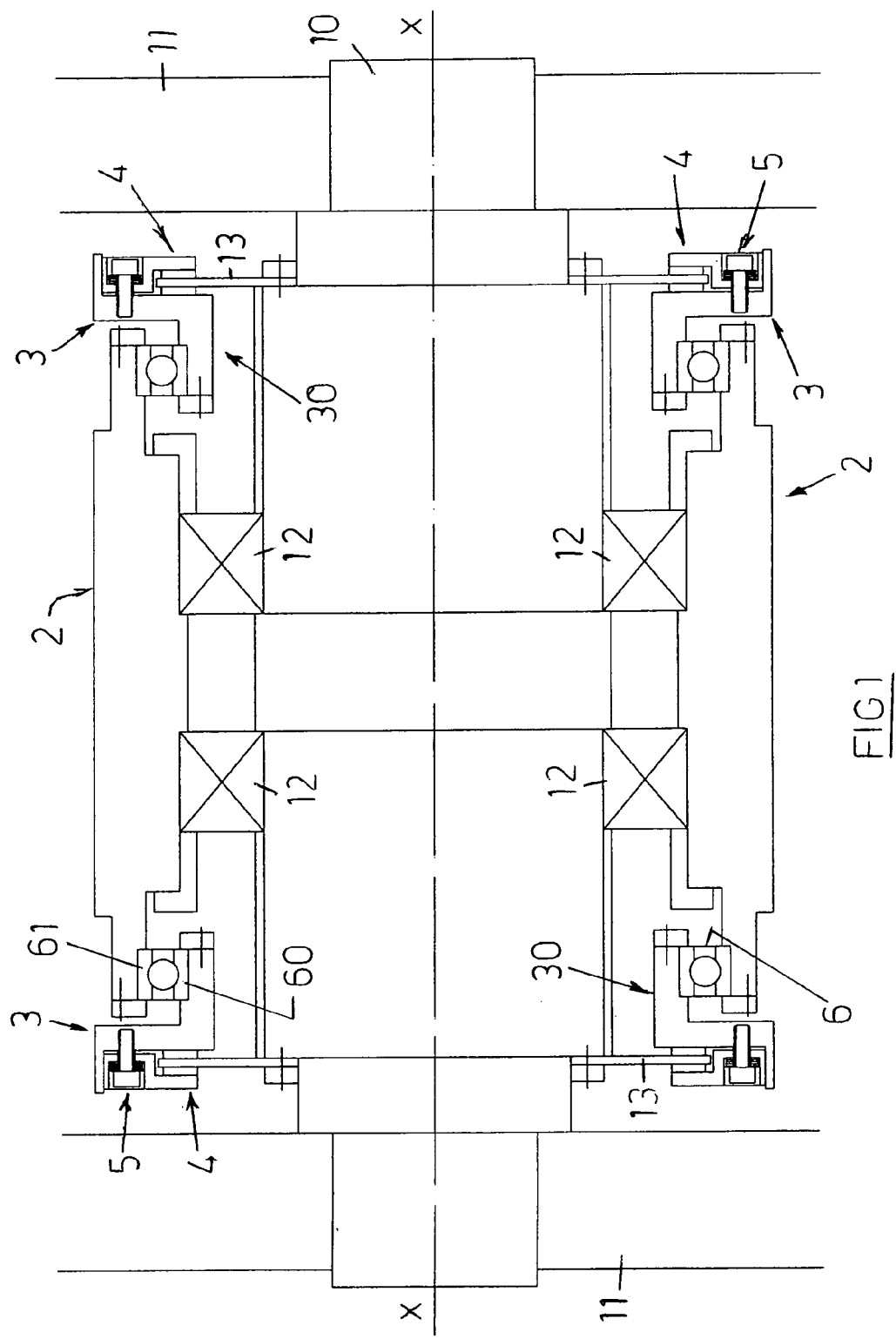
FIG. 1 is a schematic view in diametral section of a roller in accordance with the present invention according to a possible form of implementation.
Figure 2:
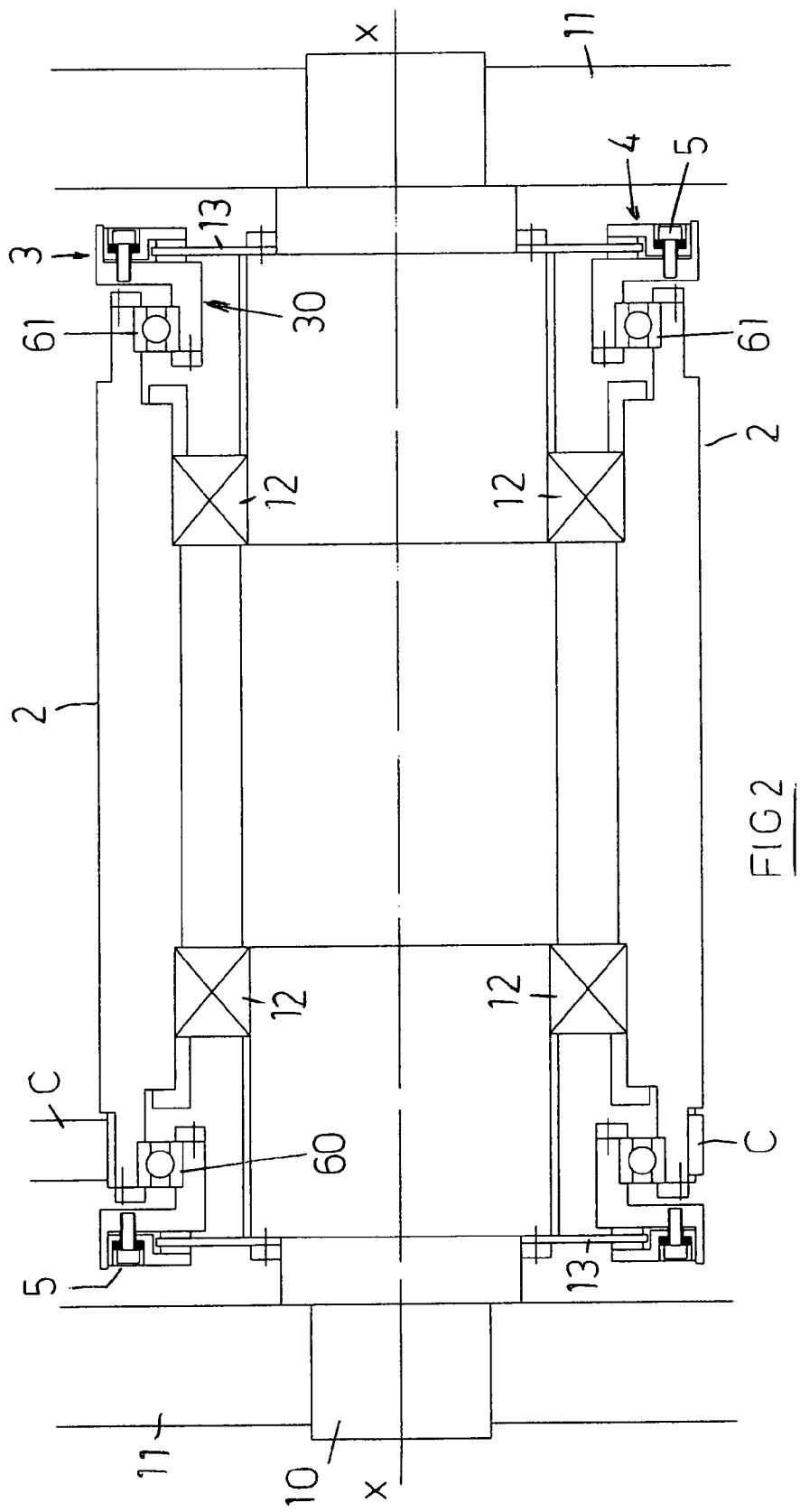
FIG. 2 is a schematic view in diametral section of a roller in accordance with the present invention according to a further form of realization.
Figure 3:
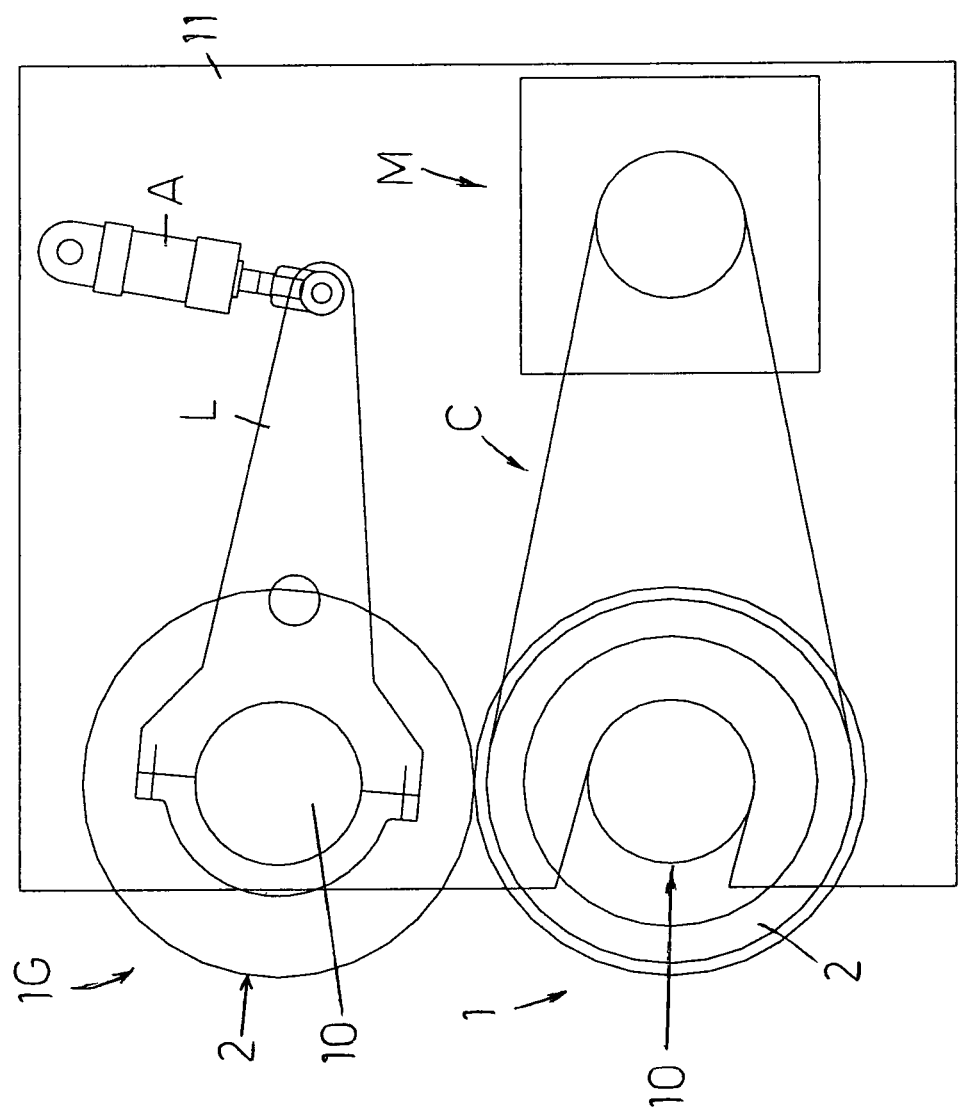
FIG. 3 is a schematic view of a possible example of use of the rollers of FIG. 1 and FIG. 2.

The longitudinal axis (x-x) of the shaft (10) is horizontal, in the examples depicted in FIG. 1, FIG. 2 and FIG. 3.

On the shaft (10) there are more low friction connecting components which, in the examples depicted in FIG. 1 and FIG. 2, consist of two bearings (12) which are placed symmetrically on the shaft (10).

On the bearings (12) there is mounted a tubular jacket (2), the latter being coaxial with the shaft (10).

Given the presence of the bearings (12), the jacket (2) is free to rotate about the axis (x-x) of the shaft (10).

The tubular jacket (2) may be provided with reliefs, or micro-reliefs, such as pyramidal or conical reliefs, or may be smooth.

In the first case, the roller (1) is an engraved roller used in an embossing unit (such as the unit "G" shown in FIG. 3).

In the second case, the roller (1) has a smooth outer and can be utilized, for example, in a calendering unit.

In both cases, the tubular jacket (2) can be made of metallic material such as steel, for example.

Furthermore, the jacket (2) may be formed by a tubular element covered with a rubber smooth surface. In this case, the roller can be used as a counter-roller or "rubber roller", in a position opposite to an engraved roller of an embossing unit (such as the unit "G" shown in FIG. 3 where the "rubber roller" is denoted by the reference "1 G").

Advantageously, in accordance with the present invention, on the two ends of the shaft (10) facing the frame (11) there is provided a fixed disk (13) coaxial with the shaft (10). Moreover, on the two bases or ends of the jacket (2) there is a mechanism which, interacting with the disks (13) which are solid with the shaft (10), provokes a damping of the vibrations induced by the uneven surface and by the deformation of the jacket (2) during the rotation thereof about the axis of the shaft (10).

With reference to the example shown in FIG. 1 and FIG. 2, the mechanism comprises, in correspondence of each of the bases of the jacket (2), a flange (3) whose hub (30) is solid with the inner ring of a bearing (6) while on the outer ring (61) of this bearing there is fixed a corresponding portion of the inner surface (surface facing the shaft 10) of the jacket (2). The hub (30) of the flange (3) is coaxial with the shaft (10) and is positioned between the inner ring (60) of the bearing (6) and the shaft (10). Since the flange (3) is solid with the inner ring (60) of the bearing (6), it is isolated from the rotation of the jacket (2) around the axis of the shaft (10). In other words, the jacket (2) does provokes the rotation of the flange (3) because the latter is solid with the inner ring (60) of the bearing (6). And, since the jacket (2) is fixed on the outer ring (61) of the bearing (6), it is free to rotate around the axis of the shaft (10). In practice, while the jacket (2) can rotate around the axis of the shaft (10), there is no rotation of the flange (3).

The flange (3) features an outer side (31) facing the frame (11) and on this side of the flange (3) there is mounted an annular counter-flange (4) by means of bolts (5) with a preload spring (50). The counter-flange (4) features a side (41) facing the flange (3), i.e. facing the outer side (31) of the latter. On each of the opposing sides (31, 41) of the flange (3) and the counter-flange (4) there is a ring (32, 42) of friction material (e.g. Ferodo or the like). Between the flange (3) and the counter-flange (4), and more particularly between the rings (32) and (42) and in contact with them, there is the edge of the disc (13).

Thus, any vibration of the jacket (2), which involves corresponding translation movements of the same to and from the shaft (10), are damped due to friction that develops between the rings (32, 42) and the disc (13), friction that opposes the relative motion of the rings (32, 42) —subject to translation since they are solid with the inner ring of the bearing (6) —with respect to the disc (13) which is fixed being it solid with the shaft (10).

The bolts (5) allow the adjusting of the distance between the opposing sides of the flange (3) and the counter-flange (4) and, therefore, of the pressure exerted by the rings (32) and (42) on the disc (13).

The device described above is therefore a mechanism for damping the vibrations induced by the possible deformation of the jacket (2) in its rotation around the shaft (10), mechanism that is positioned and acting between the jacket (2) and the shaft (10).

In the scheme of FIG. 3, where the rollers between which passes a paper web to be embossed (for sake of simplicity the paper web is not represented in the diagram) are shown with different reference numerals (1, 1G) despite their structure is the same, the engraved roll (1) is coupled to a motor (M) which makes it to rotate about the axis (x-x) through a toothed belt (C), partially visible also in FIG. 2, which engages the respective tubular jacket at a toothed side portion of the latter; and the rubber roller (1G) is mounted at each end of its shaft (10) on a lever (L) hinged to the fixed frame (11) and coupled to an actuator (A) that urges it towards the underlying engraved roller (1).

Practically, the construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

While specific embodiments of the invention have been shown and described in detail to illustrate the application of the principles of the invention, it will be understood that the invention may be embodied otherwise without departing from such principles.

The invention claimed is:
1. A roller for treating a paper web, the roller comprising:
   a central fixed shaft linked to a fixed frame on both ends thereof;
   low-friction elements mounted on said shaft;
   a tubular skirt mounted on said low-friction elements, said tubular skirt being coaxial with the shaft, said tubular skirt being free to rotate about a longitudinal axis of said shaft and being subject to vibrations during said rotation; and
   a means for dampening said vibrations, said dampening means being provided and acting between said tubular skirt and said shaft, said dampening means comprising a pair of disks, each of said disks being solid to a respective base of said shaft and coaxial with said shaft, each of said disks having a portion in contact with two frictioning rings which are connected with said tubular skirt, wherein said two frictioning rings are respectively provided by a flange and a counter-flange connected with said tubular skirt by means of a bearing made by an external ring and an inner ring, said tubular skirt being mounted on said external ring of said bearing and said flange being mounted on said inner ring of the same bearing.

2. A roller according to claim 1, wherein a contact pressure between said frictioning rings and said disks is adjustable.

3. A roller for treating a paper web, the roller comprising:
   a central fixed shaft linked to a fixed frame on both ends thereof;
   low-friction elements mounted on said shaft;
   a tubular skirt mounted on said low-friction elements, said tubular skirt being coaxial with the shaft, said tubular skirt being free to rotate about a longitudinal axis of said shaft and being subject to vibrations during said rotation; and
   a means for dampening said vibrations, said dampening means being provided and acting between said tubular skirt and said shaft, said dampening means comprising a pair of disks and friction rings, said friction rings being connected to said tubular skirt, each of said disks being solid to a respective base of said shaft and coaxial with said shaft, each of said disks having a portion in contact with two of said friction rings, one or more of said friction rings moving relative to one or more of said disks upon vibration of said tubular skirt, wherein said vibration of said tubular skirt is dampened via friction generated between one or more of said friction rings and one or more of said disks.

4. A roller according to claim 3, wherein a contact pressure between said frictioning rings and said disks is adjustable.

5. A roller according to claim 3, wherein said frictioning rings are respectively provided by a flange and a counter-flange connected with said tubular skirt by means of a bearing made by an external ring and an inner ring.

6. A roller according to claim 5, wherein said tubular skirt is mounted on said external ring of said bearing and said flange is mounted on said inner ring of the same bearing.

7. A roller for treating a paper web, the roller comprising:
   a fixed frame;
   a central fixed shaft connected to said fixed frame;
   low-friction elements mounted on said shaft;
   a tubular jacket mounted on said low-friction elements, said tubular jacket being coaxial with the shaft, said tubular jacket being rotatable about a longitudinal axis of said shaft;
   a first disk connected to said shaft;
   a second disk connected to said shaft;
   a first friction ring in direct contact with one side of said first disk;
   a second friction ring in direct contact with another side of said first disk;

a third friction ring in direct contact with one side of said second disk; and a fourth friction ring in direct contact with another side of said second disk, one or more of said first friction ring, said second friction ring, said third friction ring and said fourth friction ring moving relative to one or more of said first disk and said second disk upon movement of said jacket, wherein friction is generated via movement between said one or more of said first friction ring, said second friction ring, said third friction ring and said fourth friction ring and said one or more of said first disk and said second disk, said friction dampening vibration of said jacket.

8. A roller according to claim 7, wherein a contact pressure between said frictioning rings and said disks is adjustable.

9. A roller according to claim 7, wherein said frictioning rings are respectively provided by a flange and a counter-flange connected with said tubular skirt by means of a bearing made by an external ring and an inner ring.

10. A roller according to claim 9, wherein said tubular skirt is mounted on said external ring of said bearing and said flange is mounted on said inner ring of the same bearing.

* * * * *